US007411541B2

(12) United States Patent
Khatwa

(10) Patent No.: US 7,411,541 B2
(45) Date of Patent: Aug. 12, 2008

(54) SYSTEMS AND METHODS FOR PRESENTING VERTICAL WEATHER INFORMATION ON PLAN VIEW DISPLAYS

(75) Inventor: Ratan Khatwa, Sammamish, WA (US)

(73) Assignee: Honeywell International Inc., Morristown, NJ (US)

( * ) Notice: Subject to any disclaimer, the term of this patent is extended or adjusted under 35 U.S.C. 154(b) by 30 days.

(21) Appl. No.: 11/621,932

(22) Filed: Jan. 10, 2007

(65) Prior Publication Data
US 2008/0165051 A1 Jul. 10, 2008

(51) Int. Cl.
*G01S 7/12* (2006.01)
*G01S 13/95* (2006.01)

(52) U.S. Cl. .................. 342/26 R; 342/26 B; 342/176; 342/179; 342/182

(58) Field of Classification Search .............. 342/26 R, 342/26 B, 176–182
See application file for complete search history.

(56) References Cited

U.S. PATENT DOCUMENTS

| 3,333,263 | A | * | 7/1967 | Kazakevicius et al. | ........ 342/65 |
|---|---|---|---|---|---|
| 4,940,987 | A | * | 7/1990 | Frederick | ................... 342/26 D |
| 5,049,886 | A | * | 9/1991 | Seitz et al. | ................ 342/26 B |
| 5,198,819 | A | * | 3/1993 | Susnjara | .................... 342/26 B |
| 5,202,690 | A | * | 4/1993 | Frederick | ................... 342/26 B |
| 5,392,048 | A | * | 2/1995 | Michie | ..................... 342/26 D |
| 5,920,276 | A | * | 7/1999 | Frederick | ................... 342/26 B |
| 6,081,764 | A | * | 6/2000 | Varon | ......................... 701/120 |
| 2003/0004641 | A1 | * | 1/2003 | Corwin et al. | .............. 701/301 |
| 2003/0006928 | A1 | * | 1/2003 | Szeto et al. | ................... 342/26 |
| 2006/0004496 | A1 | * | 1/2006 | Tucker et al. | .................. 701/4 |
| 2008/0004756 | A1 | * | 1/2008 | Hedrick | ......................... 701/3 |

\* cited by examiner

*Primary Examiner*—John B Sotomayor

(57) ABSTRACT

Systems and methods for presenting vertical weather information on plan view displays. An example method retrieves weather radar return information stored in a volumetric buffer and determines if a weather anomaly of the retrieved weather radar return information is above or below a predefined threshold from a present flight altitude of an aircraft. If a weather anomaly is determined to be above the threshold from the aircraft's present flight altitude, a first image is generated in a first geometric pattern and displaying the first image on a plan view display. If the weather anomaly is determined to be below the aircraft's present flight altitude, a second image is generated in a second geometric pattern and displaying the second image on the plan view display. The first geometric pattern is different from the second geometric pattern.

14 Claims, 5 Drawing Sheets

SYSTEMS AND METHODS FOR PRESENTING VERTICAL WEATHER INFORMATION ON PLAN VIEW DISPLAYS

BACKGROUND OF THE INVENTION

The RDR-4000 Weather Radar System provides very useful display information based on volumetric weather information stored in a three dimensional buffer. Currently, the RDR-4000 provides presentation of relevant weather (primary returns) and non-relevant weather (secondary returns). The primary returns are shown as solid and the secondary returns are displayed with a crosshatched pattern. The display does not indicate whether the returns are above or below the current aircraft altitude. In order for the pilot to determine whether the weather pattern is above or below the aircraft, the pilot would need to switch to viewing the weather in a vertical view display mode, such as that shown in FIG. 1. Also, the current RDR-4000 MANUAL Mode allows pilot to determine if weather returns are above or below the aircraft, but only one altitude at a time can be selected (in increments of 1000 ft). FIG. 2 illustrates a plan view display that shows the weather patterns of FIG. 1. The closest weather pattern is a primary weather pattern and is shown as a solid weather pattern. The other weather patterns are not located in the same plane as the aircraft and are, thus, displayed as secondary returns in a slashed manner.

Therefore, there exists a need for providing more information in a plan view display with regard to vertical location of existing weather patterns.

SUMMARY OF THE INVENTION

Aircraft weather radar display systems and methods are provided. An example method retrieves weather radar return information stored in a volumetric buffer and determines if a weather anomaly of the retrieved weather radar return information is above or below a predefined threshold from a present flight altitude of an aircraft. If a weather anomaly is determined to be above the threshold from the aircraft's present flight altitude, a first image is generated in a first geometric pattern and displaying the first image on a plan view display. If the weather anomaly is determined to be below the aircraft's present flight altitude, a second image is generated in a second geometric pattern and displaying the second image on the plan view display. The first geometric pattern is different from the second geometric pattern.

In one aspect of the present invention, the first geometric pattern includes dots of a first size and the second geometric pattern includes dots of a second size that is smaller than the first size.

In another aspect of the present invention, the first geometric pattern includes one or more lines within the image that have a positive slope and the second geometric pattern includes one or more lines within the image that have a negative slope.

In still another aspect of the present invention, at least one of a top value or a bottom value of a weather anomaly is determined based on the data stored in the volumetric buffer and the determined at least one top value or bottom value is displayed adjacent to the associated image on the plan view display.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 3:
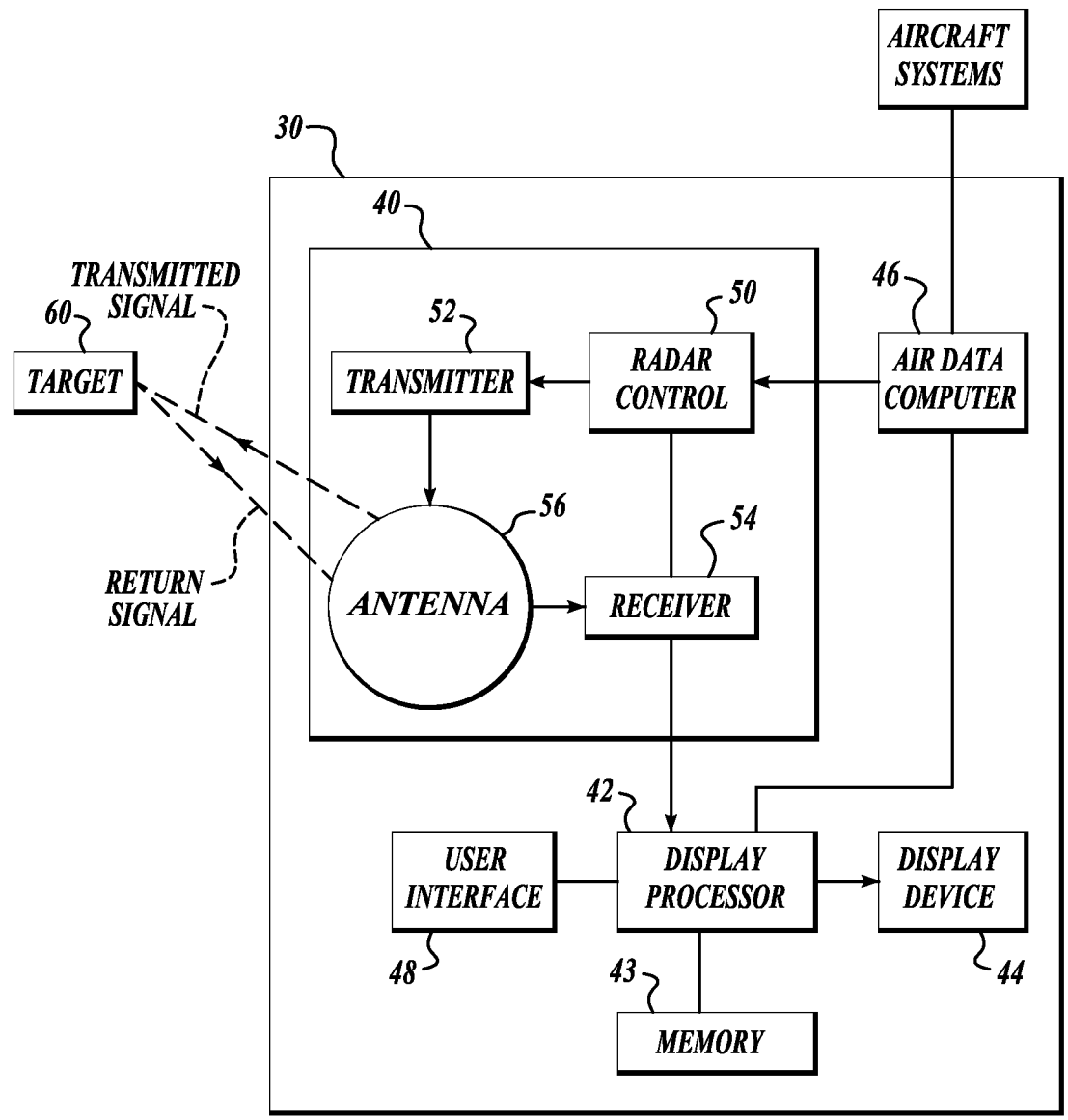
FIG. 3 illustrates a block diagram of an example system formed in accordance with an embodiment of the present invention.

FIG. 3 illustrates an example system 30 for presenting on a plan view weather radar display information that indicates relative vertical position of any present weather patterns. The system 30 includes a weather radar system 40, a display processor 42, memory 43, a display device 44, an air data computer 46, and a user interface 48 coupled to the display processor 42. The display processor 42 is electrically coupled to the radar system 40, the display device 44, the air data computer (ADC) 46, and the memory 43. An example of the radar system 40 includes a radar controller 50, a transmitter 52, a receiver 54, and an antenna 56. The radar controller 50 controls the transmitter 52 and the receiver 54 for performing the sending and receiving of signals through the antenna 56 based on aircraft data (i.e., position, heading, roll, yaw, pitch, etc.) received from the ADC 46, a Flight Management System (FMS), Inertial Navigation System (INS), and/or Global Positioning System (GPS) (not shown). The ADC 46 generates air data based on signals received from various aircraft flight systems.

The radar system 40 transmits radar signals from the antenna 56 into space and receives return signals (reflectivity values) if a target 60 is contacted by the transmitted radar signal. Preferably, the radar system 40 digitizes the return signals and sends the digitized signals to the display processor 42. The display processor 42 translates the received return signals for storage in a three-dimensional buffer in the memory 43. The display processor 42 then generates a two-dimensional image for presentation on the display device 44 based on any control signals sent from the user interface 48 or based on settings of the processor 42.

The translated return signals (return data), as determined by the radar system 40 or processor 42, identify certain weather targets, such as rain/moisture, wind shear, or turbulence. The type of weather target identified is based on a corresponding present algorithmic interpretation of the reflectivity values. The pilot selects the type of weather identified using the user interface 48.

Figure 1:
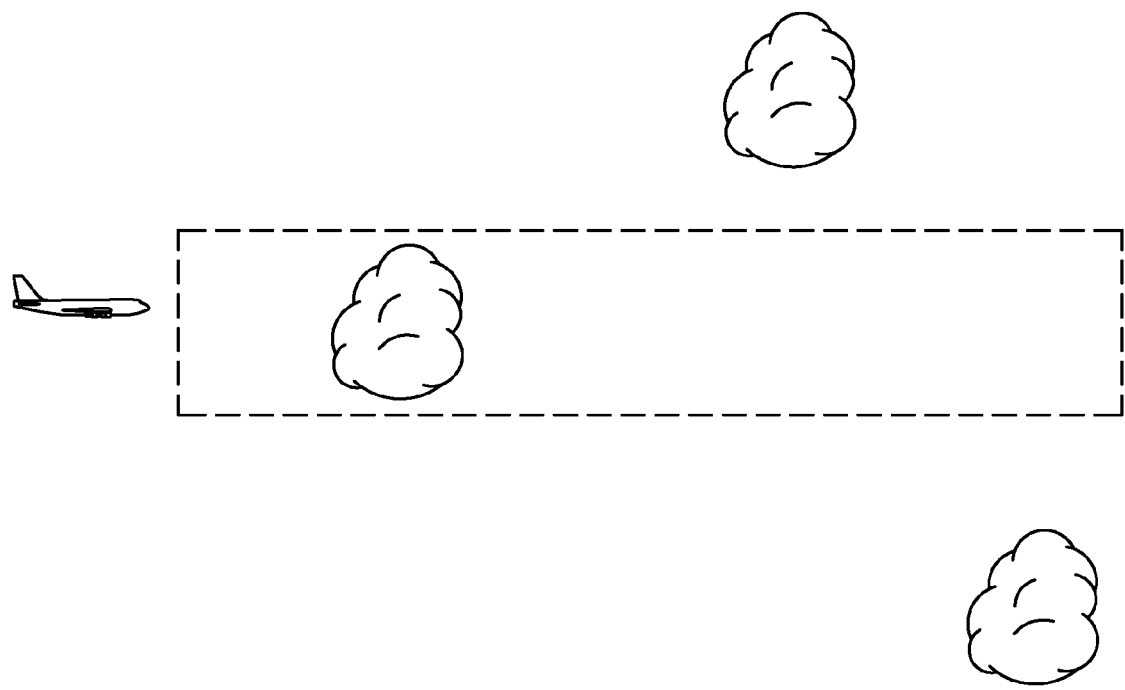
FIG. 1 illustrates a plan view display of an example prior art system.
Figure 2:
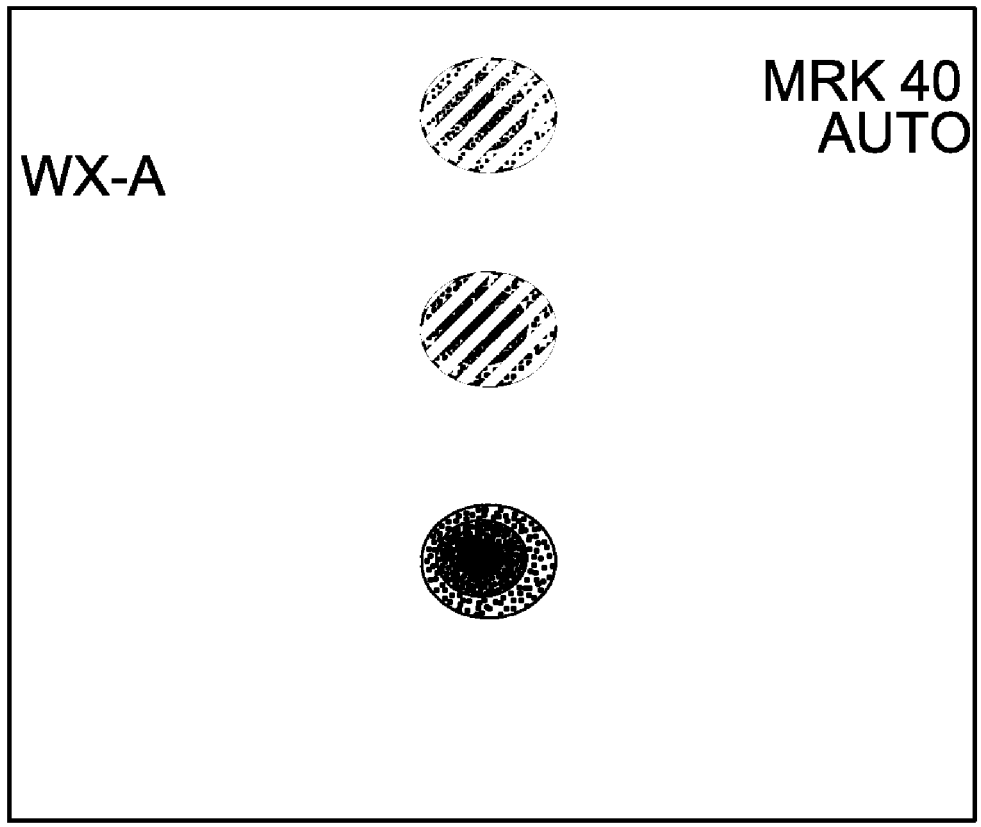
FIG. 2 illustrates a switch panel and a prior art plan view display that presents the weather that is shown in FIG. 1.
Figure 4:
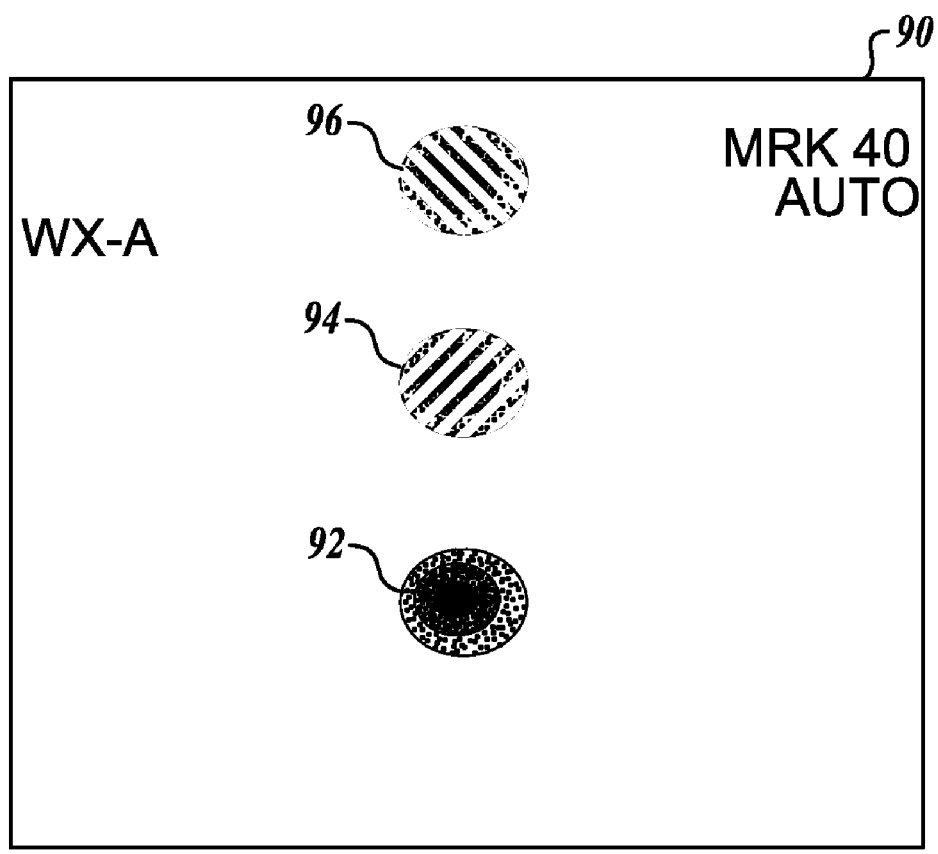
FIG. 4 illustrates a plan view display of weather patterns located at different altitudes than the present aircraft.
Figure 5:
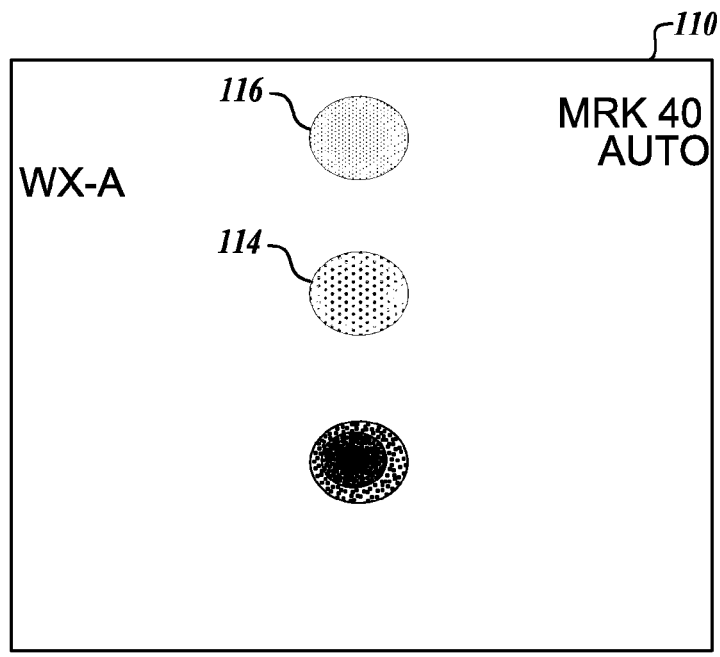
FIG. 5 illustrates a plan view illustrating an alternate bottom and floor display of weather patterns that are out-of-plane.
Figure 6:
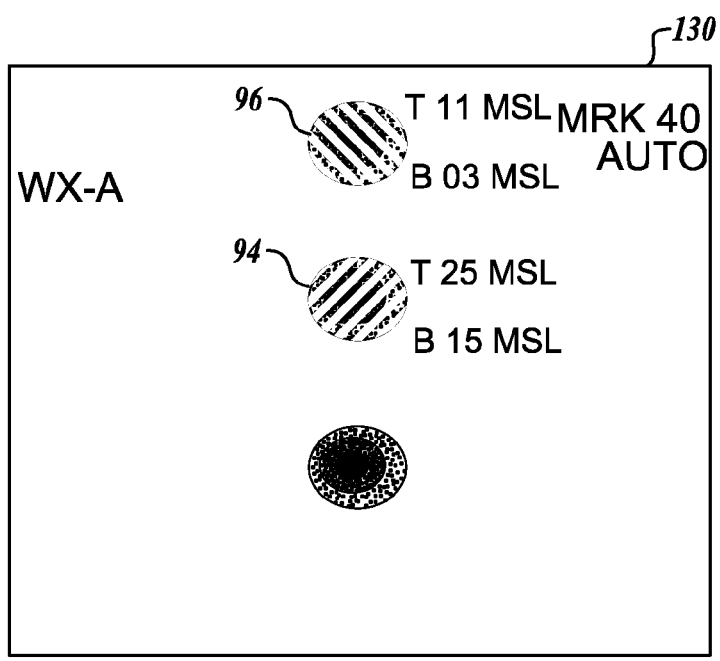
FIG. 6 illustrates still another embodiment for display of weather patterns in a plan view display formed in accordance with an embodiment of the present invention.

FIGS. 4-6 illustrate various embodiments formed in accordance with the present invention for illustrating techniques for displaying vertical location information on a plan view display (display device 44) and are examples of such with respect to the weather information shown in the vertical view display of FIG. 1.

As shown in FIG. 4, a first plan view display 90 illustrates three weather patterns 92, 94, 96. The first weather pattern 92 is displayed as a solid image in the plan view display 90 because, as indicated in FIG. 1, the weather pattern 92 correlates to the primary weather pattern which is the closest weather pattern to the aircraft in the same plane as the aircraft. The second displayed weather pattern 94 correlates to the weather pattern shown in FIG. 1 that is above the flight plane of the aircraft (or above a threshold amount greater than the aircraft's present altitude). In this example, the displayed weather pattern 94 includes lines that match the background of the plan view display 90. The lines start at a lower left of the displayed weather pattern 94 and extend to the upper right at a predefined angle (positive slope—e.g. 45°). The third weather pattern 96 correlates to the weather pattern shown in FIG. 1 that is farthest away from the aircraft and below the aircraft's present flight altitude (or a threshold amount less than the aircraft's present altitude). The display processor 42 determines that because the weather pattern associated with the displayed weather pattern 96 is below the aircraft's altitude, then the weather pattern 96 is displayed with lines that are approximately the same color as the background of the plan view display 90. The lines start at an upper left of the weather pattern 96 and extend to the lower right of the weather pattern 96 (i.e., negative slope—e.g. 45°). Thus, it can be easily determined by just looking at the plan view display 90 that the first weather pattern 92 is approximately at the aircraft's present flight altitude, the second weather pattern 94 is a weather anomaly that is above the aircraft's present flight altitude, and the third weather pattern 96 is a weather anomaly that is farthest away from the aircraft and below the aircraft's present flight altitude. The lines may be displayed in various other colors or patterns provided that the displayed pattern of a weather pattern that is above the aircraft is distinguishable from the displayed pattern of a weather pattern that is below the aircraft. The displayed weather patterns that are not within a threshold distance from the aircraft's present altitude maybe displayed with various graphics provided that the weather patterns above the aircraft's present altitude are displayed differently than the weather patterns below the aircraft's present altitude.

FIG. 5 illustrates an alternate embodiment for illustrating another plan view display 110 that presents the differences between weather anomalies that are above the aircraft and those that are below the aircraft. The plan view display 110 illustrates three weather patterns that correlate to the weather pattern shown in FIG. 1. The weather patterns 114 and 116 are displayed as equally spaced apart dots. For the weather pattern 114 that identifies the weather anomaly that is above the aircraft's flight path, the processor 42 displays the dots within the displayed weather pattern 114 at a first size. For the weather pattern 116 that identifies a weather anomaly that is below the aircraft's flight altitude (FIG. 1), the processor 42 displays the dots of the weather pattern at a second size. The first size of the dots is larger than the second size of the dots. In another embodiment, the first size of the dots is smaller than the second size of the dots. Thus, a pilot can quickly interpret from the plan view display 110 that because the weather pattern 114 has large sized dots, it is above the aircraft's present altitude and the weather pattern 116 has small dots, because it is located below the aircraft's present altitude.

FIG. 6 illustrates the same weather patterns as shown in FIG. 4 but next to each of the weather patterns includes information of upper and lower vertical extents of the associated weather anomaly. The processor 42 determines the boundaries of the weather anomalies using data analysis techniques based on the weather data stored in the three dimensional buffer (memory 43). In this example, the weather anomaly associated with the second weather pattern 94 is identified as having a top that is at 25,000 feet above sea level (T 25 msl) and a bottom that is at 15,000 feet above sea level (B 15 msl). Therefore, the pilot can easily see by looking at the plan view display 130 that there are weather patterns both below and above the aircraft's present flight altitude and where the tops and bottoms of these weather patterns are located.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An aircraft weather radar display method comprising:
   retrieving weather radar return information stored in a volumetric buffer, the weather radar return information includes at least one weather anomaly;
   determining if the at least one weather anomaly is above or below a predefined threshold from a present flight altitude of an aircraft;
   if the weather anomaly is determined to be above the threshold from the aircraft's present flight altitude, generating a first image in a first geometric pattern and displaying the first image on a plan view display; and
   if the weather anomaly is determined to be below the aircraft's present flight altitude, generating a second image in a second geometric pattern and displaying the second image on the plan view display,
   wherein the first geometric pattern is different from the second geometric pattern.

2. The method of claim 1, wherein the first geometric pattern includes dots of a first size and the second geometric pattern includes dots of a second size that is smaller than the first size.

3. The method of claim 1, wherein the first geometric pattern includes one or more lines within the image that have a positive slope.

4. The method of claim 3, wherein the second geometric pattern includes one or more lines within the image that have a negative slope.

5. The method of claim 1, further comprising:
   determining at least one of a top altitude value or a bottom altitude value of the weather anomaly based on the data stored in the volumetric buffer; and
   displaying the determined at least one top value or bottom value adjacent to the associated image on the plan view display.

6. The method of claim 1, further comprising:
   determining if the weather anomaly is within a predefined threshold from a present flight altitude of the aircraft;
   if the weather anomaly is determined to be within the threshold from the aircraft's present flight altitude, generating a third image in a third geometric pattern and displaying the third image on the plan view display.

7. The method of claim 6, wherein the third geometric pattern is a solid object.

8. An aircraft weather radar display system comprising:
   a memory configured to store weather radar return information in a volumetric buffer, the stored weather radar return information includes at least one weather anomaly;
   a display device configured to display a plan view; and
   a display processor in data communication with the memory and the display device, the display processor comprising:

a first component configured to determine if the at least one weather anomaly is above or below a predefined threshold from a present flight altitude of an aircraft;

a second component configured to generate a first image in a first geometric pattern and display the first image on the plan view display, if the weather anomaly is determined to be above the threshold from the aircraft's present flight altitude; and a third component configured to generate a second image in a second geometric pattern and display the second image on the plan view display, if the weather anomaly is determined to be below the aircraft's present flight altitude, wherein the first geometric pattern is different from the second geometric pattern.

9. The system of claim 8, wherein the first geometric pattern includes dots of a first size and the second geometric pattern includes dots of a second size that is smaller than the first size.

10. The system of claim 8, wherein the first geometric pattern includes one or more lines within the image that have a positive slope.

11. The system of claim 10, wherein the second geometric pattern includes one or more lines within the image that have a negative slope.

12. The system of claim 8, wherein the display processor further comprises:

a fourth component configured to determine at least one of a top altitude value or a bottom altitude value of the weather anomaly based on the data stored in the volumetric buffer and display the determined at least one top value or bottom value adjacent to the associated image on the plan view display.

13. The system of claim 8, wherein the first component is further configured to determine if the weather anomaly is within a predefined threshold from a present flight altitude of the aircraft, further comprising a fourth component configured to generate a third image in a third geometric pattern and displaying the third image on the plan view display, if the weather anomaly is determined to be within the threshold from the aircraft's present flight altitude.

14. The system of claim 13, wherein the third geometric pattern is a solid object.

* * * * *